(12) United States Patent
Saferna et al.

(10) Patent No.: US 10,487,981 B2
(45) Date of Patent: Nov. 26, 2019

(54) HIGH-PRESSURE COMPOSITE VESSEL AND THE METHOD OF MANUFACTURING HIGH-PRESSURE COMPOSITE VESSEL

(71) Applicant: TECHPLAST SPÓŁKA Z O.O., Wieprz (PL)

(72) Inventors: Adam Saferna, Wieprz (PL); Dawid Saferna, Wieprz (PL)

(73) Assignee: TECHPLAST SPOLKA Z O. O., Wieprz (PL)

( * ) Notice: Subject to any disclaimer, the term of this patent is extended or adjusted under 35 U.S.C. 154(b) by 106 days.

(21) Appl. No.: 15/024,744

(22) PCT Filed: Jan. 5, 2015

(86) PCT No.: PCT/PL2015/000001
§ 371 (c)(1),
(2) Date: Mar. 28, 2016

(87) PCT Pub. No.: WO2015/108429
PCT Pub. Date: Jul. 23, 2015

(65) Prior Publication Data
US 2016/0348839 A1    Dec. 1, 2016

(30) Foreign Application Priority Data
Jan. 15, 2014   (PL) ........................................ 406846

(51) Int. Cl.
*F17C 1/06*         (2006.01)
*B29B 11/14*       (2006.01)
(Continued)

(52) U.S. Cl.
CPC ................ *F17C 1/06* (2013.01); *B29B 11/14* (2013.01); *B29B 13/02* (2013.01); *B29B 13/04* (2013.01);
(Continued)

(58) Field of Classification Search
CPC ...... F17C 1/00; F17C 1/02; F17C 1/06; F17C 1/04; F17C 1/16; B29B 11/00;
(Continued)

(56) References Cited

U.S. PATENT DOCUMENTS 5,839,600 A * 11/1998 Moreira .................... F17C 1/16
220/560.04
7,648,042 B2 * 1/2010 Lee .......................... F17C 13/06
220/582

(Continued)

FOREIGN PATENT DOCUMENTS

DE   10 2011 119 771 A1   6/2012
EP       0 203 631 A2   12/1986
(Continued)

*Primary Examiner* — Steven A. Reynolds
*Assistant Examiner* — Javier A Pagan
(74) *Attorney, Agent, or Firm* — Horst M. Kasper, Esq.

(57) ABSTRACT

A hight-pressure composite vessel comprising a casing fabricated through blow-moulding a preform of thermoplastic, a connection pipe fitting. In the connection connection pipe fitting (3) with a retaining collar (7), opposite to a sealing groove (9) designed for an o-ring seal, there is a groove (10) for a seeger to mount a non-detachable collar (11*a*) of the preform (11) by way of the seeger (10*a*). A method of manufacturing the high-pressure composite vessel under which the casing of the vessel is fabricated of a perform that is blow-moulded so as to obtain the required dimensions thereof, whereas the preform of a thermoplastic material is fabricated using any technology; and the casing of the vessel is connected with the connection pipe fitting, and the external surface of the vessel re reinforced by a special composite layer. The preform (11) first undergoes a process of controlled crystallization and, then, the ring-shaped groove (11*b*) is made in the collar (11*a*) of the preform (11).

17 Claims, 5 Drawing Sheets

(51) Int. Cl.
    *F17C 1/16*     (2006.01)
    *B29B 13/02*     (2006.01)
    *B29B 13/04*     (2006.01)
    *B29C 49/00*     (2006.01)
    *B29C 65/64*     (2006.01)
    *B29C 65/00*     (2006.01)
    *B29C 70/08*     (2006.01)
    *B29L 31/00*     (2006.01)
    *B29C 49/06*     (2006.01)
    *B29K 67/00*     (2006.01)
    *B29K 77/00*     (2006.01)
    *B29K 307/04*     (2006.01)

(52) U.S. Cl.
    CPC .......... B29C 49/0073 (2013.01); B29C 65/64 (2013.01); B29C 66/742 (2013.01); B29C 70/085 (2013.01); F17C 1/16 (2013.01); *B29B 2911/1402* (2013.01); *B29B 2911/1404* (2013.01); *B29B 2911/14026* (2013.01); *B29B 2911/14033* (2013.01); *B29B 2911/1442* (2013.01); *B29B 2911/14486* (2013.01); *B29C 49/06* (2013.01); *B29C 66/7422* (2013.01); *B29K 2067/003* (2013.01); *B29K 2077/00* (2013.01); *B29K 2307/04* (2013.01); *B29L 2031/712* (2013.01); *B29L 2031/7156* (2013.01); *F17C 2201/0104* (2013.01); *F17C 2201/0109* (2013.01); *F17C 2201/056* (2013.01); *F17C 2201/058* (2013.01); *F17C 2203/0604* (2013.01); *F17C 2203/066* (2013.01); *F17C 2203/0619* (2013.01); *F17C 2203/0663* (2013.01); *F17C 2205/0305* (2013.01); *F17C 2205/0352* (2013.01); *F17C 2223/0123* (2013.01); *F17C 2223/035* (2013.01); *F17C 2270/02* (2013.01); *F17C 2270/07* (2013.01); *F17C 2270/0754* (2013.01); *F17C 2270/0781* (2013.01)

(58) Field of Classification Search
    CPC ......... B29B 11/14; B29B 11/06; B29B 11/16; B29B 13/02; B29B 13/022; B29B 13/04; B29C 65/64; B29C 65/70; B29C 66/74; B29C 66/742; B29C 70/04; B29C 70/06; B29C 70/08; B29C 70/085
    See application file for complete search history.

(56)     References Cited

U.S. PATENT DOCUMENTS

| | | |
|---|---|---|
| 2005/0167433 A1 | 8/2005 | Kuehn |
| 2014/0103051 A1* | 4/2014 | Kanezaki ............ F17C 13/002 |
| | | 220/587 |

FOREIGN PATENT DOCUMENTS

| | | |
|---|---|---|
| EP | 0 753 700 A1 | 1/1997 |
| EP | 0 815 383 A1 | 1/1998 |
| EP | 1 586 807 A2 | 10/2005 |
| EP | 2 112 423 A1 | 10/2009 |
| GB | 113 4033 A | 11/1968 |
| PL | 356 742 A1 | 6/2004 |
| WO | WO 2008/153414 A1 | 12/2008 |
| WO | WO 2010/059068 A2 | 5/2010 |

* cited by examiner

HIGH-PRESSURE COMPOSITE VESSEL AND THE METHOD OF MANUFACTURING HIGH-PRESSURE COMPOSITE VESSEL

The subject of the Invention is a high-pressure composite vessel designed, in particular, to store pressurized liquids and gases and a method of manufacturing a high-pressure composite vessel.

The more commonly used are high-pressure, blow-moulded thermoplastic vessels that have a metal connection pipe fitting sunk in or glued to a liner and the whole bodies of those vessels are reinforced with a fibrous composite material placed thereon using a winding technique.

A pressure container and a method of manufacturing it are known from the Description of the Invention No. GB 1134033. According to the cited Invention, the method of manufacturing such a vessel comprises the following steps: layering on numerous reinforcing fibres to form a so called bladder and using an adequate material able to form an encompassing matrix by binding all the fibres together so as to make one inflexible or flexible skin. The term 'fibre' as used in the Description and Claims of the Invention as above refers both to single fibres of any shape and to flat belts. The fibres are being stretched meridian-wise between the two ends of the bladder on its entire surface, and the subsequent reinforcing windings are wound helically within the cylindrical part of the bladder. Preferably, glass fibres are used. A material used to make the bladder (liner) is a ductile elastomeric material, preferably a rubber.

The Description of the Invention No. EP1586807 discloses a composite tank and a method to manufacture it. The composite tank as disclosed consists of an inner part (a so called bladder, inner tube or liner) and a two-piece collar that is connected with the inner part; the two-piece collar has an inner part that is provided with an external surface with bosses to make a connection with a bush-like liner's neck, and an outer part also provided with an inner surface that adjoins one fragment of the inner part so as to enable their mutual binding. Additionally, the outer part of the collar has also a retaining collar that should rest against the external surface of the liner and a tip to fix a valve element, whereas, on the collar and the liner, two layers of the composite material are placed. It is essential that the inner part of the collar is threaded and a collar is formed between the outer and the inner part. So the collar is basically a two-piece element; this fact impacts the method of producing it because, according to the Invention, the inner part of the collar is formed together with the liner, and the bottom inner surface is kept unbound (non-connected) with the liner. Next, the outer part of the collar is connected to the liner and the whole assembly is covered with layers of composite material; the outer layer is made of glass fibre.

A pressure composite vessel is known from the Description of the Patent No. EP0753700; the vessel under this Patent is designed to store pressurized liquid gases. In particular, the object of the Patent refers to the construction of a connection pipe fitting of the composite vessel. According to the Patent as above, the vessel is characterized by there being a recess where the vessel is connected with the connection pipe fitting; in the recess (within the area of reinforcement), there is an inner and outer part; both are threaded; and a sealing bevelled washer is placed between the external surface of the vessel and the bottom surface of the collar; the bevel of the washer is oriented towards the middle axis of the vessel; on the frontal side of the neck's part of the vessel, there is a sealing ring made of a material that is characterized by a low Young's (elastic) modulus and a high elongation.

From the published Patent No. EP2112423, a method is known of producing a multilayer container designed to store, in particular, pressurized liquids and gases. This method consists in that both the container and the connection pipe fitting are manufactured simultaneously.

Under a method as disclosed in the Patent No. EP08102903, a preform is connected with a connection pipe fitting by way of a thread and this preform is heated to reach a plasticization temperature of a material it is made of. Next, this preform is blow moulded to the working dimensions of the vessel itself. The vessel is finished/reinforced by laminating it with resin-impregnated fibres wound thereon, by hardening and covering it with an additional protecting layer.

From the Patent Application No. WO2010059068, there is known a method of manufacturing high-pressure container to store, especially liquids and gases under a higher pressure; the method consists in manufacturing the component using any known technology of making preforms made up of a thermoplastic material; the preform is shaped exactly as the prospective container and is blow moulded so as to get the required size; its outer surface is reinforced by means of winding resin-impregnated fibres; the preform is matched with a connection pipe fitting as well as with the upper and lower pads that correspond in shape with the shape of recess in the connection pipe fitting and the bottom of the preform/container; finally, a high pressure container is manufactured according to the method as described in the Invention.

The hitherto known solutions show that, at the first stage of the high-pressure vessel production process, a liner is manufactured by blow-moulding a thermoplastic preform; next, the liner is helically connected with a connection pipe fitting. Usually, at the last stage of producing a vessel designed to operate under an increased pressure, a laminated reinforcement is made, i.e. the fibres are appropriately wound onto the vessel's surface, for example in the Inventions numbered as US20050167433, PL 197773, and EP 08102903.

In the hitherto disclosures, the connection pipe fittings applied were threaded and this often caused uncontrollable leakage in the spot where two different materials: polymer of the vessel and metal of the fitting contacted each other (connection spot).

According to the Invention, the high-pressure vessel consists of: —a cylindrical casing manufactured by blow-moulding a preform with a collar, made of a plastic material, preferably of polyethylene terephthalate (PETE) or polyamide; —a composite layer reinforced using a load-carrying wound wrap made of high-modulus carbon fibres; —a connection pipe fitting.

In the bottom part of the casing, opposite to the connection pipe fitting, there is a reinforcing bottom unit made of aluminium and fixed within the composite layer of the vessel; the unit is curved like an arch with its convex part oriented towards the centre of the casing; where the bottom unit contacts the bottom of the vessel, it is shaped as arched-convex, branched wings that stick to the arched-concave bottom of the casing; the unit is also equipped with additional, ring-shaped bosses mounted inside the composite layer. On the side of the connection pipe fitting, there is a washer to match with the connection pipe fitting. The aluminium connection pipe fitting is manufactured as a one whole element and equipped with a retaining collar designed to rest on the external part of the casing; above the retaining collar, there is one extra ring-shaped boss placed around the opening of the connection pipe fitting.

On the circumference of the inner part of the connection pipe fitting, there is a ring-shaped sealing groove with an o-ring seal therein including an outer groove of the sealing ring for a seeger, which protects against axial shifts that might occur as a result of forces acting on the composite vessel.

The connection pipe fitting is connected with the casing manufactured through blow-moulding a preform; in the upper part of the preform, there is a ring-shaped groove manufactured so as to exactly face the groove in the casing's collar with the mounted seeger as soon as the casing is connected with the connection pipe fitting, and the inner sealing groove with the o-ring seal mounted therein must be exactly in the cylindrical part of the casing's collar. The cross-section of the seeger is trapezoidal and includes a right angle. Its perpendicular surfaces fit excellently the walls of the grooves in the connection pipe fitting and in the collar of the casing, and the right angles prevent the production of a force component that could possible cause the ring to slip out of the grooves whereas the mitre-cuts make it possible to insert the preform into the ring previously fixed in the groove in the connection pipe fitting.

The right angles used in the cross-section of the ring cause the entire system to become inseparable after the connection pipe fitting is connected with the casing equipped with the collar.

Additionally, the construction of the connection pipe fitting according to the Invention causes the sealing ring to distort under the pressure of gas in the composite vessel and to exert pressure onto the o-ring seal. Gas that may potentially get between the sealing and the inner surface of the connection pipe fitting is cut off owing to the distortion of the sealing and the o-ring; further, pursuant to the law of conservation of energy, the pressure exerted onto the connection pipe fitting from the inside of the vessel and the forces, exerted by the material of the connection pipe fitting onto the sealing ring, become equalized. At that time, the forces interacting between the connection pipe fitting and gas cancel out and, in this way, ensure the stability of the entire joint. An extra stabilization of the joint is provided by a special stop groove with seeger, performed in the collar of the preform (and, after the accomplished blow moulding, in the collar of the vessel's casing); this element is an excellent additional sealing for the entire joint since it constitutes an non-detachable and extremely high-pressure resistant blockage.

The casing, i.e. the blow-moulded preform and the connection pipe fitting are put together and wrapped in composite material layers; next, they are covered with an additional protective layer and, so, they form a hybrid resistant to dynamic overloads.

According to the Invention, the method of manufacturing a composite high-pressure vessel consists in blow-moulding the preform of, preferably, polyterephtalane, ethylene, or polyamide, next, in connecting the manufactured casing with a connection pipe fitting, and in strengthening the prospective vessel by making a composite reinforcement on the surface thereof, whereas, prior to blow-moulding the preform, a collar of the preform cooperating structurally with the connection pipe fitting, undergoes a process of topical crystallization. According to the Invention, the length at which the collar of the preform undergoes the crystallization equals the length of its connection with the connection pipe fitting of the vessel.

The crystallization process consists in gradual heating up the collar of the preform to a temperature between the glass transition and melting temperatures of polymer, preferably, to a temperature close to a mid-point between the glass transition and melting temperature. The temperature depends on the type of polymer the preform is made of and it ranges between 135° C. and 165° C., whereas the heating-up process is carried out for a period not exceeding than 10 minutes, preferably 5 to 6 minutes. During the ongoing crystallization process, the collar of the preform is isolated from the other part of the preform in order to avoid a phenomenon of uncontrolled spreading of crystallization. After the heating up is completed, the pliable collar of the preform is placed on a metallic cylindrical mandrel and cooled, step by step, in a bath wash for 4 to 10 minutes, preferably 5 to 6 min. The cross-section diameter of the mandrel used while cooling the preform equals the inner diameter of the connection pipe fitting; this fact guarantees the impeccable tightness of the joint produced.

The controlled crystallization process results in the thermal decomposition of polymers, i.e. in their degradation; now, the polymers form orderly arranged, lamellar polycrystalline structures, which effectively improve the polymer's mechanical properties: impact strength, tensile strength, and compression strength; also, the temperatures of deflection and the flexural (bending) modulus are increased. Crystallizing the collar of the preform with the use of the method under the Invention results in the authentic crystallization of the external layers of the preform collar; it means that, within the cross-section, the lateral layers of the preform collar have an orderly arranged, lamellar, polycrystalline structure characterized by a required strength and hardness, whereas the middle layer (ca. 30%) has an amorphous, more pliable structure. A mixed, crystalline-amorphous structure of the preform collar excellently enhances the tightness of the vessel. Under the conditions of common use of the composite vessel according to the Invention, the pliability of the middle layer improves the vessel's resistance against the tensile and compressing stresses occurring therein.

Upon the completion of the crystallization process, a stop groove, its cross-section being a trapezoid with a right angle, is formed on the external surface of the preform.

Under the method acc. to the Invention, the pre-prepared preform with the collar (that underwent the process of controlled crystallization and the ring-shaped groove was made therein) are blow-moulded acc. to the well known method; consequently, the required shape and necessary dimensions thereof are produced; next, the ready preform is mounted together with the connection pipe fitting, equipped with a retaining collar, and with the bottom unit. The vessel manufactured is filled with gas that stiffens the surfaces of the vessel and prevents them from being dented impacted internally; the next step is to cover the vessel with the reinforcing composite layer. To reinforce the external surface of the vessel, thermosetting resins are used, preferably polyester resins as well as fibres, preferably a bundle of carbon and aramid fibres, whereas the way the fibres are arranged in the bundle is of essential importance: the fibres must be arranged exactly in the same order, e.g. carbon fibre-aramid fibre-carbon fibre.

The composite layer is fabricated by winding a bundle of filaments via a wet filament winding technology with the use of three winding patterns: helical, polar, and hoop winding.

The sequence of winding fibres is as follows: wraps wound acc. to the polar pattern, preferably 4 wraps; wraps made acc. to the helical pattern, preferably three wraps;

wraps wound acc. to the hoop pattern, preferably three; and one wrap made acc. to the polar pattern.

In helical winding, the bundle of filaments is wound and, at the same time, the vessel or the winding mandrel rotates and is moved along the entire length of the vessel resulting in an angle of inclination of the rotation axis, its measure ranging from 49° to 59°, preferably 54°. The helically wound wraps ensure the best operational effect of the reinforcement fibres. While the winding continues, the vessel is brought to vibrate slightly; the vibrations enhance the arrangement of the fibres on the liner and eliminate void spaces in the composite material; the winding proceeds under a constant inner pressure ranging from 2 to 2.8 bar; the value of the inner pressure depends on the size of the vessel; thus, the bigger the composite vessel, the lower the inner pressure; and the smaller the vessel, the higher the inner pressure.

Polar winding is the second winding pattern of wrapping fibres: a bundle of filaments is wrapped as the winding mandrel passes from pole to pole of the vessel, and, simultaneously, the bundle of fibres filaments rotates about the connection pipe fitting and, so, becomes a unit to fix the connection pipe fitting.

Hoop (or girth) winding is the third winding pattern; it is used to reinforce the cylindrical part of the vessel. Individual layers of fibres are reinforced using epoxy resin. The bearing structure of wound layers fabricated according to the Invention forms a hybrid and guarantees that the reinforcing filament bundles excellently fulfil their strengthening job.

After the composite layer consisting of 10 to 12 wound wraps of fibres is fabricated, the vessel undergoes a hardening process, i.e. the vessel rotates slowly about its axis and the temperature is gradually increased at regular fixed intervals over a period of time. The hardening process starts with the vessel being heated to a temperature of 20° C.; next, this temperature is maintained over a period of 16 to 28 hours, preferably 24 hours. During this time, polymers are cross-linked, i.e. cross-links (known as bridges) are formed among them and, consequently, linear polymer molecules are converted into spatial macromolecules. The time and temperature of cross-linking process causes the parameters of polymers to improve, for example their rigidity increases as does their weather-, radiation-, and temperature-resistance. After cross-linking, the temperature rises gradually and, as a result thereof, a thermal hardening process takes place; the vessel is kept, at first, at a temperature of 20° C.+/−2° C. over a period of 24+/−2 hours; next, at 45° C.+/−2° C. for a period not exceeding 72+/−2 hours (from the moment when the vessel heating process has begun); then, at a temperature not exceeding 70° C.+/−2° C. for further 34+/−2 hours; finally, at a temperature not exceeding 25° C.+/−2° C. for 8+/−2 hours. The result of the hardening process conducted as described above is that the thermal strength of the composite layer increase to a value above 80° C.

The last fabrication phase of the composite vessel according to the Invention is the making of an additional protective layer resistant to UV, water, chemical substances, and impact.

The composite vessel produced according to the method under the Invention is extraordinarily tough and durable, resistant to deformations, high temperatures, and chemical impacts; moreover, it is light in weight and, therefore, it has many applications: in emergency medical service (EMS), chemical emergency service, fire-fighting, as paintball gas bottles and deep-sea diving bottles. One of very important characteristics of the vessel acc. to the Invention is that it is 100% non-corrosive.

The vessel—subject of this Invention—is exemplified by one embodiment depicted in the Drawing comprising several Figures.

EXAMPLE: 1

The composite high-pressure vessel acc. to the Invention consists of a casing 1, fabricated from a blow-moulded preform 11 equipped with a collar 11a and a composite layer 2, reinforced with a load-bearing wound wrap made of high-modulus carbon and aramid fibres, and of a connection pipe fitting 3 made of aluminium.

Figure 7:
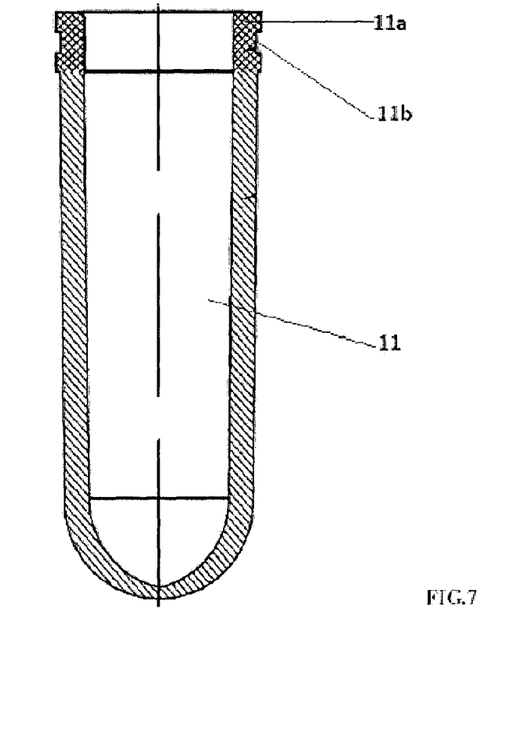
FIG. 7 shows a longitudinal section of the preform.

The preform is made of polyethylene terephthalate (PETE) or polyamide.

Figure 1:
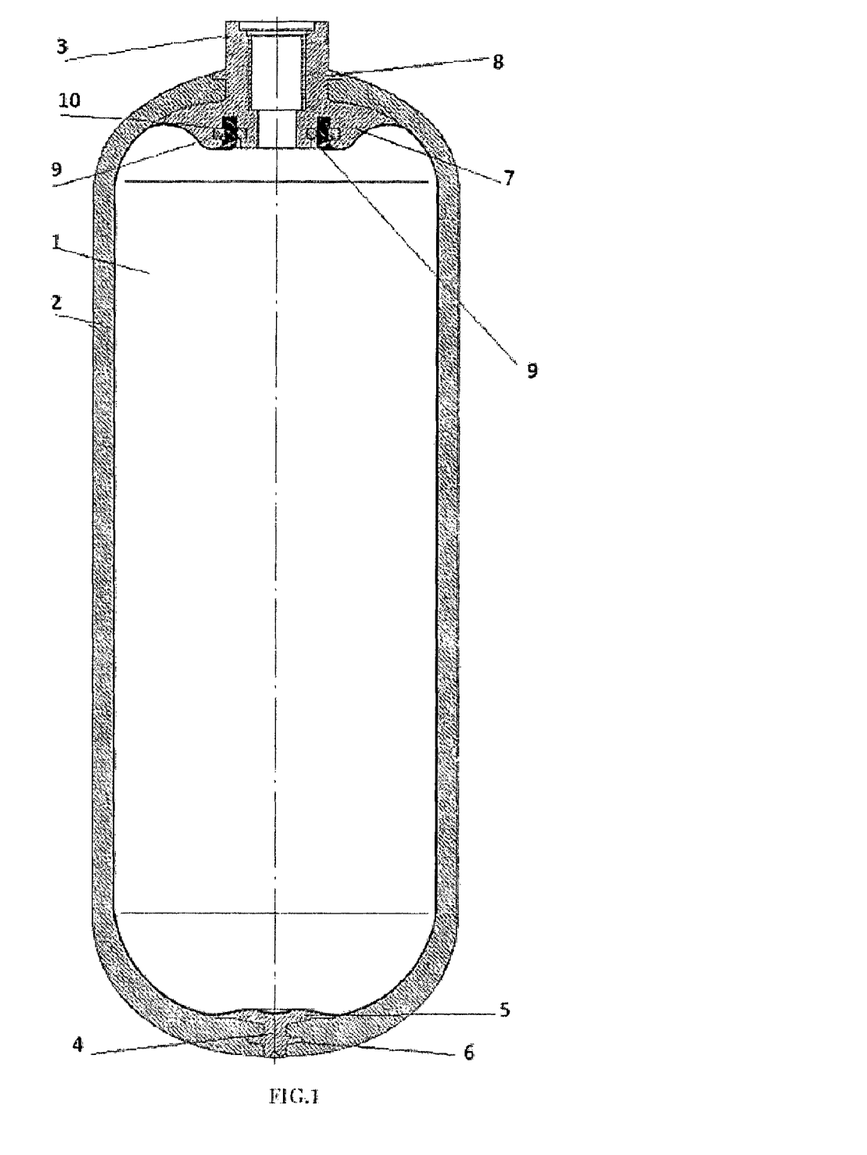
FIG. 1 shows a longitudinal section of the composite high-pressure vessel.
Figure 2:
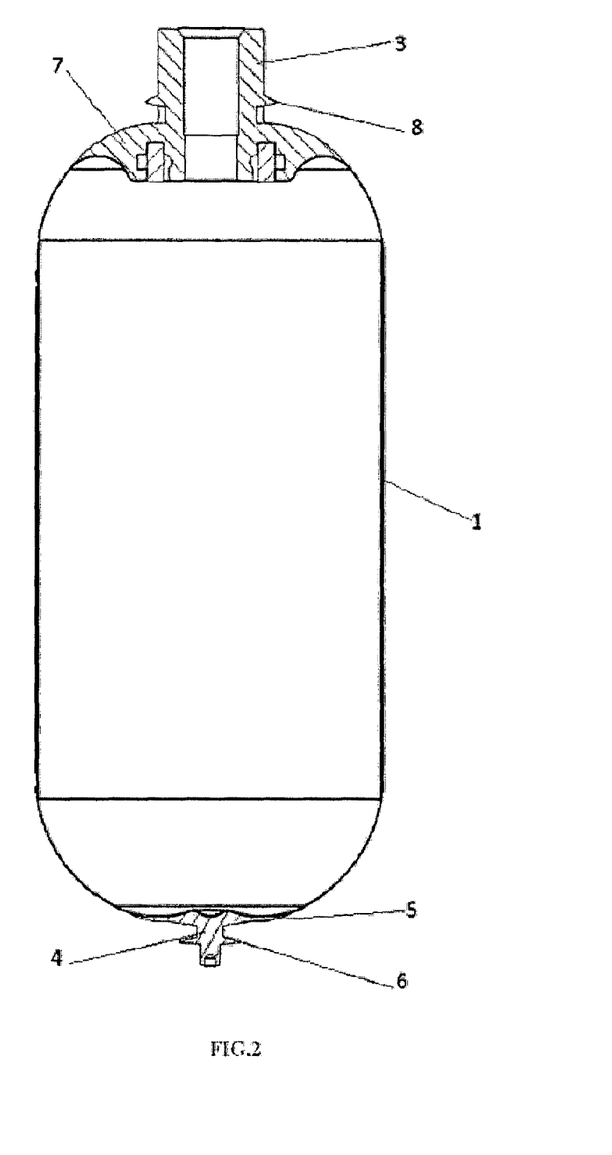
FIG. 2 shows a longitudinal section of the liner with the connection pipe fitting.

As shown in FIG. 1, inside the casing 1, opposite to the connection pipe fitting 3, there is a reinforcing bottom unit 4 made of aluminium and fixed within the composite layer of the vessel. Where the bottom unit 4 contacts the bottom of the vessel, it is shaped as arched-convex, branched wings 5 that stick to the arched-concave bottom of the casing; the unit is also equipped with additional, ring-shaped bosses 6 mounted inside the composite layer. The connection pipe fitting 3 is manufactured as one whole element and equipped with a retaining collar 7 designed to rest on the external part of the casing; above the retaining collar there is one extra ring-shaped boss 8 placed around the opening of the connection pipe fitting.

Figure 4:
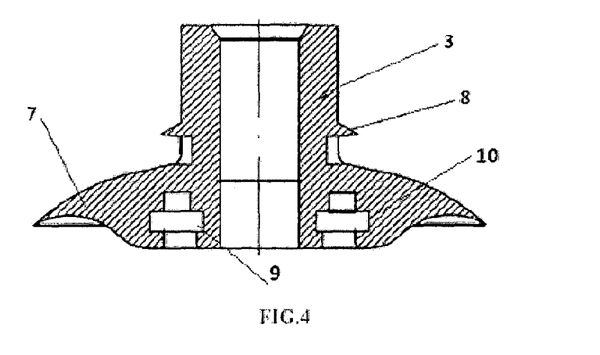
FIG. 4 shows a longitudinal section of the connection pipe fitting.
Figure 5:
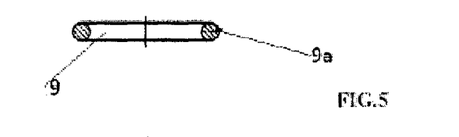
FIG. 5 shows a longitudinal section of the o-ring sealing.
Figure 6:
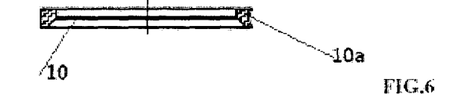
FIG. 6 shows a longitudinal section of the seeger.

On the circumference of the inner part of the connection pipe fitting, there is a ring-shaped sealing groove 9 with an o-ring seal 9a mounted therein, and, also, a groove 10 in a seeger 10a that protects against axial shifts that might occur as a result of forces acting on the composite vessel.

The connection pipe fitting 3 is connected with the casing 1 manufactured while blow-moulding the preform 11; in the upper part of the preform 11, there is a collar 11a with a ring-shaped groove 11b manufactured so that as soon as the casing 1 is connected with the connection pipe fitting 3, the outer ring-shaped groove 10 in the connection pipe fitting 3 exactly faces the groove 11b in the collar of the preform 11, and the inner sealing groove 9 with an o-ring seal 9a mounted in the groove is seated exactly in the cylindrical part of the collar 11a of the preform 11.

EXAMPLE: 2

The first stage of the method of manufacturing a composite high-pressure vessel acc. to the Invention consists in that the collar of the preform 11 undergoes a topical crystallization process. The length of the collar 11a of the preform 11 equals the length of the connection with the connection pipe fitting 3. Prior to launching the topical crystallization, the collar 11a of the preform 11 is isolated from the other part of the preform 11 in order to avoid a phenomenon of uncontrolled spreading of the crystallization. The crystallization process consists of gradually heating up the collar 11a for, preferably, 6 minutes, to reach a temperature close to a mid-point between the glass transition and melting temperature. After the heating up is completed, the pliable collar of the preform is placed on a metallic cylindrical mandrel and cooled, step by step, in a bath wash for, preferably, 6 min, and the cross-section diameter of the mandrel used while cooling the preform equals the inner diameter of the connection pipe fitting. The effect of the accomplished crystallization process is that the produced structure of the collar is crystalline-amorphous.

Figure 3:
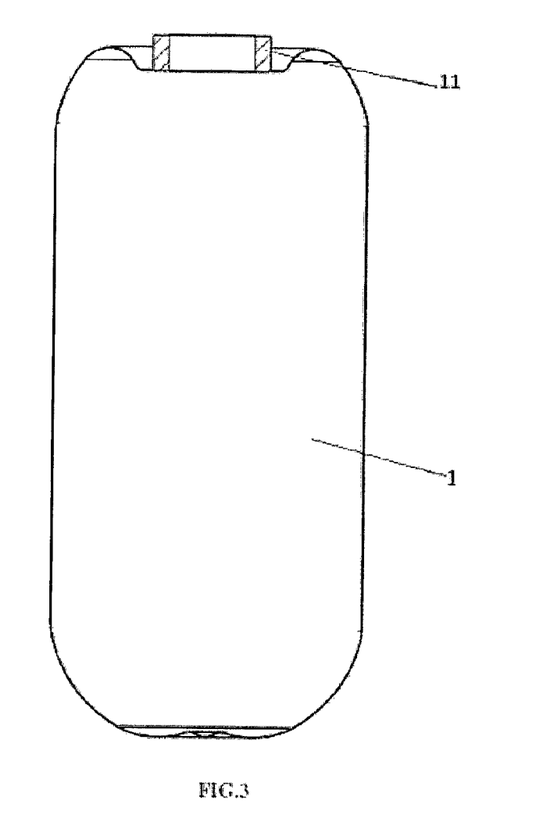
FIG. 3 shows a longitudinal section of the liner.

Upon the completion of the topical crystallization process, a ring-shaped groove 11b is made on the outer surface of the collar 11a of the preform, and this groove is made so that, as soon as the liner 1 is connected with the connection pipe fitting 3, the groove 11b faces exactly the outer ring-shaped groove 10 of the connection pipe fitting 3, and the sealing groove 9 with the o-ring sealing seal 9a mounted in the groove 9 is seated exactly in the cylindrical part of the collar 11a of the preform.

At the subsequent stage of the method acc. to the Invention, the pre-prepared preform 11 with the collar 11a, that underwent the controlled crystallization process and which has a ring-shaped groove 11b, is blow-moulded using a well-know technology and the preform obtained a required shape and necessary dimensions; next, the ready preform is mounted together with the connection pipe fitting 3, equipped with a retaining collar 7 and with the bottom unit 4. The vessel fabricated is filled in with gas until a required constant gas pressure value of 2 bar is obtained; thereafter, the entire vessel is coated with a reinforcing composite layer 2 (inner fibre).

Figure 8:
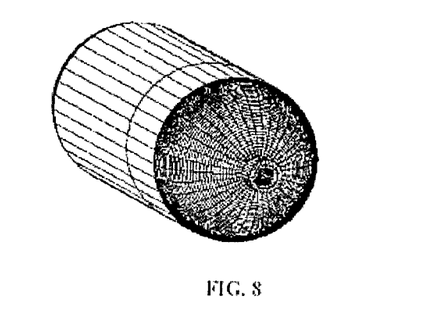
FIG. 8 illustrates a polar winding pattern.

The composite layer is fabricated by winding a bundle of filaments impregnated with resin, preferably epoxy resin, via a wet filament winding technology with the use of three winding patterns: helical, polar, and hoop winding as presented in FIGS. 6 to 8 on the Drawing.

Figure 9:
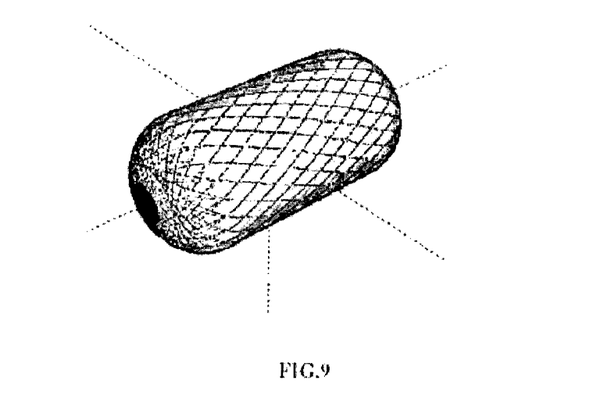
FIG. 9 illustrates a helical winding pattern.
Figure 10:
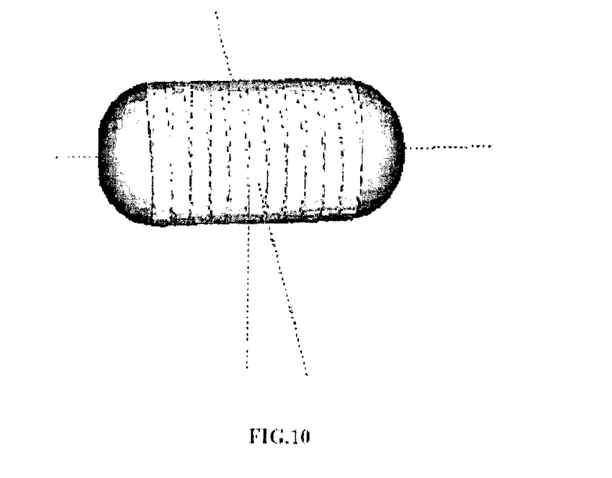
FIG. 10 shows a hoop (or girth) winding pattern.

Preferably, the sequence of winding bundles of filaments is as follows: four wraps wound acc. to the polar pattern; three wraps made acc. to the helical pattern; three wraps wound acc. to the hoop pattern; and one wrap made acc. to the polar pattern.

In helical winding, the bundle of filaments is wound and, at the same time, the vessel or the winding mandrel rotates and is moved along the entire length of the vessel, at an angle of inclination of the rotation axis being, preferably 54°. The helically wound wraps ensure the best operational effect of the reinforcement filaments. While the winding continues, the vessel is brought to vibrate slightly; the vibrations enhance the arrangement of the filaments on the liner and eliminate void spaces in the composite material.

When applying a polar winding pattern to wind filaments, the bundle of filaments is wrapped as the winding mandrel passes from pole to pole of the vessel, and, simultaneously, the bundle of filaments passes around the connection pipe fitting and, so, it becomes an element to fix the connection pipe fitting.

After the composite layer consisting of 10 to 12 wound wraps of filaments is fabricated, the vessel undergoes a hardening process: the temperature is gradually increased at regular, fixed intervals over a period of time while the vessel rotates slowly about its axis. At the first stage of the hardening process, the vessel is kept at a temperature of 20° C. for a 24 hour period. During this time, polymers are cross-linked and, as a result, the rigidity increases as does their weather-, radiation-, and temperature-resistance. After cross-linking, the temperature rises gradually and, as a result, the thermal strength is increased to 46° C. Next, the temperature rises to 45° C. and the vessel is kept at this temperature for max 24 hrs. Then again, the temperature rises to 70° C. and is maintained for another 24 hrs. Finally, the temperature drops to 23° C. during a period of 12 hours. The thermal strength obtained during the hardening process according to the Invention is 82° C.

At the final stage of manufacturing the composite vessel according to the Invention, the vessel is coated by an additional protective layer to protect it against UV, water, chemical substances, and, additionally, to increase its impact strength.

The composite vessel acc. to the Invention is characterized by excellent mechanical properties (high deformation resistance, high fatigue strength, and high impact strength).

The invention claimed is:

1. A high-pressure composite vessel comprising a casing (1) producible through blow moulding a thermoplastic material of a preform and integral with a preform collar (11a), a connection fitting (3), with a retaining collar (7), an o-ring seal (9a) mounted in a sealing groove (9) shaped in the connection fitting (3), and a Seeger ring (10a) mounted in a fixing groove (10) shaped in the connection fitting (3) opposite to the sealing groove (9), said Seeger ring (10a) is fixing the preform collar (11a) in the connection fitting (3), characterized in that an annual groove (11b) is shaped in the external side of the preform collar (11a), and said annular groove (11b) is facing the fixing groove (10) shaped in the connection fitting (3) after mounting the casing (1) to the connection fitting (3), and in that the sealing groove (9) is facing the inner cylindrical side of the preform collar (11a).

2. The composite vessel according to claim 1, characterized in that the cross-section of the Seeger ring (10a) is trapezoidal with a right angle.

3. The composite vessel according to claim 1, the casing (1) with the preform collar (11a) is made of polyethylene terephthalate (PETE) or polyamide.

4. The composite vessel according to claim 1 characterized in that the casing (1) is reinforced with external composite layer (2), and in that this composite layer (2) is made in the form of a braiding of bundles of carbon-aramid filaments and of epoxy resin.

5. The composite vessel according to claim 4 characterized in that the bundle of filaments is formed using two outer carbon filaments and one inner aramid filament.

6. The composite vessel according to claim 1, characterized in that it has a bottom unit (4) with arched-convex, branched wings (5) fitting to an arched-concave bottom of the casing (1), and in that the connection fitting (3) has an external annular boss (8) around the opening of the connection fitting (3), while the bottom unit (4) has additional annular bosses (6) placed inside a reinforcing composite layer (2).

7. A high-pressure composite vessel comprising a casing (1) producible by blow-moulding a preform (11) to required dimensions, said casing (I) being connected with a connection fitting (3), and externally reinforced by a composite layer (2), and where the preform is made of thermoplastic material, characterized in that the preform (11) first undergoes a process of controlled crystallization so that thermoplastic material of the casing (1) is a crystallized thermoplastic material, and then an annular groove (11b) is made in the preform collar (11a) so that the preform collar (11a) retained in the composite vessel has the annular groove (11b), and subsequently the preform (11) is blow-moulded to required dimensions and assembled with the connection fitting (3) equipped with a retaining collar (7) so that the composite vessel has the connection fitting (3) equipped with the retaining collar (7) and an o-ring seal (9a) placed in a sealing groove (9) in the connection fitting (3), and a Seeger ring (10a) placed in a fixing groove (10) in the connection fitting (3), and the connection fitting (3) is put and clamped onto the preform collar (11a) of the casing (1), and then the vessel is filled with gas until the pressure inside the vessel becomes constant, and a composite layer (2) is fabricated by braiding the bundles of reinforcing filaments according to three winding patterns: helical, polar, and hoop, and then the reinforcing composite layer (2) is thermally hardened, so that the casing (1) of the composite vessel is covered by the thermally hardened composite layer (2) consisting of the bundles of reinforcing filaments arranged according to three winding patterns: helical, polar, and hoop.

8. The composite vessel according to claim 7, characterized in that the crystallization process of the preform collar (11a) is isolated from the rest of the preform (11) and is run in the following way: the preform collar (la) is gradually heated to a temperature close to a mid-point between the glass transition temperature and the melting point temperature for 8 to 10 minutes, then plastified preform collar (11a) is placed on a metallic cylindrical mandrel with a cross-section diameter equal to the inner diameter of the connection fitting (3), and then the preform collar (11a) is gradually cooled in a bath wash for 4 to 10 minutes, so that the preform collar (11a) retained in the composite vessel is crystallized.

9. The composite vessel according to claim 8, characterized in that the temperature of the heated preform collar (11a) is in a range between 135° C. and 165° C., and the heating process continues for 5 to 6 minutes, whereas the process of gradual cooling of the preform collar (11a) in the bath wash continues for 5 to 6 minutes.

10. The composite vessel according to claim 7, characterized in that after the crystallization process of the preform collar (11a) is completed, the annular groove (11b) is shaped on the outer side of the preform collar (11a) so that the annular groove (11b) on the outer side of the preform collar (11a) is facing the fixing groove (10) in the connection fitting (3) after the casing (1) is assembled with the connection fitting (3), and the o-ring seal (9a) mounted in the inner sealing groove (9) meets the inner cylindrical side of the preform collar (11a).

11. The composite vessel according to claim 7, characterized in that the thermosetting resins as well as fibres are used to produce the composite layer (2), so that the composite layer (2) consists of the thermosetting resins and fibres.

12. The composite vessel according to claim 11, characterized in that the thermosetting resins are epoxy resins, and in that the fibres are a bundle of carbon and aramid filaments, composed of two outer carbon filaments and one inner aramid filament.

13. The composite vessel according to claim 7, characterized in that the braiding is made according to helical-polar winding pattern, i.e. the bundles of filaments are wound each time the winding mandrel passes between the poles of the vessel and rotates about the connection fitting (3), and the angle of inclination of the rotation axis is maintained constant, between 53° and 55°.

14. The composite vessel according to claim 13, characterized in that the process of the filaments winding continues at a constant pressure ranging between 2 and 2.8 bar inside the vessel, and in that the pressure value inside the vessel is inversely proportional to the vessel size.

15. The composite vessel according to claim 14, characterized in that the composite layer (2) is fabricated through successive winding and finally has 10 to 12 wraps of the filament bundles, namely up to four wraps according to the polar winding pattern, up to three wraps according to the helical winding pattern, up to three wraps according to the hoop winding pattern, and one outer wrap according to the polar winding pattern.

16. The composite vessel according to claim 15, characterized in that while winding the filaments, the vessel is brought to vibrate slightly.

17. The composite vessel according to claim 16, characterized in that the temperature during the hardening process is stepwise increased from 20° C. to 70° C. at preset time intervals, and while the vessel slowly rotates about its axis, and in that at first stage of the hardening process the vessel is maintained at a temperature of 20° C.+/−2° C. for a period of time of 24 hrs+/−2 hrs, than in second stage at a temperature of 45° C.+/−2° C. for a period of time not exceeding 72 hrs+/−2 hrs from the beginning of hardening, and at third stage the temperature is increased to 70° C.+/−2° C. and kept constant for 34 hrs+/−2 hrs, and at fourth stage, the temperature is decreased to 23° C.+/−2° C. and the vessel remains at this temperature for 12 hrs+/−2 hrs.

\* \* \* \* \*